(12) United States Patent
Cheng et al.

(10) Patent No.: US 10,261,375 B2
(45) Date of Patent: Apr. 16, 2019

(54) ARRAY SUBSTRATE, DRIVING METHOD THEREOF AND DISPLAY APPARATUS

(71) Applicant: BOE TECHNOLOGY GROUP CO., LTD., Beijing (CN)

(72) Inventors: Hongfei Cheng, Beijing (CN); Jianbo Xian, Beijing (CN); Yong Qiao, Beijing (CN); Yongchun Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 98 days.

(21) Appl. No.: 14/895,126

(22) PCT Filed: Jun. 4, 2015

(86) PCT No.: PCT/CN2015/080732
§ 371 (c)(1),
(2) Date: Dec. 1, 2015

(87) PCT Pub. No.: WO2016/107073
PCT Pub. Date: Jul. 7, 2016

(65) Prior Publication Data
US 2016/0187738 A1    Jun. 30, 2016

(30) Foreign Application Priority Data

Dec. 30, 2014    (CN) .......................... 2014 1 0841743

(51) Int. Cl.
*G06F 5/00*    (2006.01)
*G02F 1/1362*    (2006.01)
*G09G 3/36*    (2006.01)

(52) U.S. Cl.
CPC ..... *G02F 1/136286* (2013.01); *G09G 3/3655* (2013.01); *G09G 2300/0426* (2013.01);
(Continued)

(58) Field of Classification Search
USPC ............... 345/87, 92, 205, 206, 211, 94, 27; 365/205, 145, 156, 232; 257/59, 71;
(Continued)

(56) References Cited

U.S. PATENT DOCUMENTS

2002/0051099 A1    5/2002   Moon
2002/0097349 A1*   7/2002   Park ................. G02F 1/136213
                                                            349/38
(Continued)

FOREIGN PATENT DOCUMENTS

CN          1920648 A       2/2007
CN          101114095 A     1/2008
(Continued)

OTHER PUBLICATIONS

Chinese Office Action dated Oct. 17, 2016.
International Search Report and Written Opinion dated Sep. 24, 2015.

*Primary Examiner* — Thuy N Pardo
(74) *Attorney, Agent, or Firm* — Dilworth & Barrese, LLP.; Michael J. Musella, Esq.

(57) ABSTRACT

Provided are an array substrate and driving method thereof, and a display apparatus. The array substrate comprises multiple storage electrode lines (1) each of which comprises at least two storage electrode signal input terminals (11). The array substrate can improve the driving capability of the storage electrode signals on the storage electrode lines (1).

18 Claims, 5 Drawing Sheets

(52) U.S. Cl.
CPC .............. *G09G 2320/0219* (2013.01); *G09G 2320/0223* (2013.01)

(58) Field of Classification Search
USPC ........................................................... 349/38
See application file for complete search history.

(56) References Cited

U.S. PATENT DOCUMENTS

| | | | | |
|---|---|---|---|---|
| 2003/0112682 | A1* | 6/2003 | Sekiguchi | G11C 5/025 365/205 |
| 2003/0201438 | A1* | 10/2003 | Park | G02F 1/136213 257/59 |
| 2005/0030783 | A1* | 2/2005 | Sekiguchi | G11C 5/025 365/145 |
| 2005/0270889 | A1* | 12/2005 | Sekiguchi | G11C 5/025 365/232 |
| 2007/0030231 | A1* | 2/2007 | Lee | G09G 3/3655 345/94 |
| 2007/0046844 | A1 | 3/2007 | Murade | |
| 2009/0121991 | A1* | 5/2009 | Chung | G02F 1/136213 345/87 |
| 2011/0234564 | A1* | 9/2011 | Kim | G09G 3/3655 345/211 |
| 2012/0081274 | A1* | 4/2012 | Chang | G02F 1/136259 345/92 |
| 2012/0092312 | A1* | 4/2012 | Xue | G09G 3/3655 345/205 |
| 2012/0161140 | A1* | 6/2012 | Xue | G02F 1/136286 257/59 |
| 2012/0224414 | A1* | 9/2012 | Deng | G11C 11/412 365/156 |
| 2014/0131718 | A1* | 5/2014 | Xue | H01L 27/124 257/71 |
| 2015/0325188 | A1* | 11/2015 | Wei | G09G 3/3648 345/92 |
| 2016/0232870 | A1* | 8/2016 | Wu | G09G 3/3677 345/206 |

FOREIGN PATENT DOCUMENTS

| | | |
|---|---|---|
| CN | 101256326 A | 9/2008 |
| CN | 104246860 A | 12/2014 |
| CN | 104460162 A | 3/2015 |

* cited by examiner

ARRAY SUBSTRATE, DRIVING METHOD THEREOF AND DISPLAY APPARATUS

TECHNICAL FIELD OF THE DISCLOSURE

The present disclosure relates to an array substrate and driving method thereof, and a display apparatus.

BACKGROUND

A liquid crystal (LC) display is a planar ultrathin display apparatus, which is widely applied to various areas. The LC display comprises an array substrate on which multiple gate lines, multiple data lines and multiple storage electrode lines are arranged.

In the display procedure of the LC display, on one hand, the gate lines or the data lines form coupling capacitance with the storage electrode lines, reducing the driving capability of the storage electrode signals on the storage electrode lines; on the other hand, with the development of the LC display towards large size, the storage electrode lines on the array substrate are long, and the resistance is large, resulting in that the driving capability of the storage electrode signals on the storage electrode lines are weaker and weaker with the increasing of the transmission distance.

Due to the above two reasons, in the using procedure of the LC display, the uniformity of the storage electrode signals on the storage electrode lines in the whole LC display is poor, causing the display quality of the LC display to be poor.

SUMMARY

At least one embodiment of the present disclosure provides an array substrate and driving method thereof, and a display apparatus, which can improve the driving capability of the storage electrode lines.

At least one embodiment of the present disclosure provides an array substrate comprising multiple storage electrode lines each of which comprises at least two storage electrode signal input terminals.

Each of the storage electrode lines comprises two storage electrode signal input terminals located at two ends of the storage electrode line.

The array substrate further comprises at least one auxiliary storage electrode line which is connected to at least one of the multiple storage electrode lines, each of the at least one auxiliary storage electrode line comprises at least one auxiliary storage electrode signal input terminal, and nodes on the multiple storage electrode lines connecting with the at least one auxiliary storage electrode line are taken as the storage electrode signal input terminals.

Only the nodes on the multiple storage electrode lines connecting with the at least one auxiliary storage electrode line are taken as the storage electrode signal input terminals.

The nodes on the multiple storage electrode lines connecting with the at least one auxiliary storage electrode line are taken as part of the storage electrode signal input terminals.

Each of the at least one auxiliary storage electrode lines is connected to all the multiple storage electrode lines.

The at least one auxiliary storage electrode line comprises a first auxiliary storage electrode line and a second auxiliary storage electrode line, and the first auxiliary storage electrode line and the second auxiliary storage electrode line are respectively connected to part of the storage electrode lines.

The first auxiliary storage electrode line is connected to odd numbered rows of the storage electrode lines, and the second auxiliary storage electrode line is connected to even numbered rows of the storage electrode lines.

The array substrate further comprises multiple mutually parallel gate lines and multiple mutually parallel data lines, the gate lines cross the data lines, the multiple storage electrode lines extend in the direction of the gate lines, and the at least one auxiliary storage electrode line extends in the direction of the data lines.

At least one embodiment of the present disclosure provides an array substrate which comprises multiple storage electrode lines each of which comprises at least two storage electrode signal input terminals. Therefore, it is possible to input storage electrode signals to the storage electrode line from at least two storage electrode signal input terminals, and thus it is possible to enhance the driving capability of the storage electrode signals on the storage electrode line to make better uniformity of the storage electrode signals over the whole display apparatus. Then, it is possible to improve the display effect of the display apparatus.

At least one embodiment of the present disclosure further provides a display apparatus comprising any of the above array substrates.

At least one embodiment of the present disclosure further provides a driving method of an array substrate comprising multiple storage electrode lines, wherein the driving method comprises:

inputting storage electrode signals to at least two storage electrode signal input terminals of each storage electrode line.

The storage electrode signals are the same as or different from a common electrode signal.

Each of the storage electrode lines comprises two storage electrode signal input terminals located at two ends of the storage electrode line, and said inputting storage electrode signals to at least two storage electrode signal input terminals of each storage electrode line comprises:

inputting the storage electrode signals to the two storage electrode signal input terminals located at the two ends of each of the storage electrode lines.

The array substrate further comprises at least one auxiliary storage electrode line which is connected to at least one of the multiple storage electrode lines, each of the at least one auxiliary storage electrode line comprises at least one auxiliary storage electrode signal input terminal, and nodes on the multiple storage electrode lines connecting with the at least one auxiliary storage electrode line are taken as the storage electrode signal input terminals; and said inputting storage electrode signals to at least two storage electrode signal input terminals of each storage electrode line comprises:

inputting the storage electrode signal to the node as the storage electrode signal input terminal by inputting the storage electrode signal to the auxiliary storage electrode signal input terminal of the at least one auxiliary storage electrode line.

Further, inputting the storage electrode signal to the node as the storage electrode signal input terminal by inputting the storage electrode signal to the auxiliary storage electrode signal input terminal of the at least one auxiliary storage electrode line, and at the same time, inputting storage electrode signal(s) to storage electrode signal input terminal(s), except the node, of the storage electrode line with the node.

The at least one auxiliary storage electrode line comprises a first auxiliary storage electrode line and a second auxiliary storage electrode line, and the first auxiliary storage electrode line and the second auxiliary storage electrode line are respectively connected to part of the storage electrode lines; and said inputting the storage electrode signal to the node as the storage electrode signal input terminal by inputting the storage electrode signal to the auxiliary storage electrode signal input terminal of the at least one auxiliary storage electrode line comprises:

inputting a first storage electrode signal to a node connecting the first auxiliary storage electrode line to at least one of the multiple storage electrode lines by inputting the first storage electrode signal to the auxiliary storage electrode signal input terminal of the first auxiliary storage electrode line; and inputting a second storage electrode signal to a node connecting the second auxiliary storage electrode line to at least one of the multiple storage electrode lines by inputting the second storage electrode signal to the auxiliary storage electrode signal input terminal of the second auxiliary storage electrode line.

The first storage electrode signal is the same as or different from the second storage electrode signal.

The first storage electrode signal has a different amplitude from the second storage electrode signal.

An embodiment of the present disclosure provides a driving method of an array substrate. The driving method of the array substrate comprises inputting storage electrode signals to at least two storage electrode signal input terminals of a storage electrode line. Therefore, it is possible to enhance the driving capability of the storage electrode signals on the storage electrode line to make better uniformity of the storage electrode signals over the whole display apparatus. Then, it is possible to improve the display effect of the display apparatus.

DETAILED DESCRIPTION

In the following, technical solutions in embodiments of the present disclosure will be clearly and completely described in connection with figures. Obviously, the described embodiments are only part embodiments of the present disclosure, rather than all the embodiments. Based on the embodiments in the present disclosure, all other embodiments obtained by those skilled in the art without creative work all belong to the protection scope of the present disclosure.

First Embodiment

An embodiment of the present disclosure provides an array substrate which can improve the driving capability of storage electrode signals on the storage electrode lines.

FIG. 1-FIG. 4 are schematic diagrams of an array substrate in the first embodiment of the present disclosure. As shown in FIG. 1 to FIG. 4, the array substrate comprises multiple storage electrode lines 1 each of which comprises at least two storage electrode signal input terminals 11. Therefore, it is possible to input storage electrode signals to the storage electrode line 1 from at least two storage electrode signal input terminals 11 simultaneously, and thus it is possible to enhance the driving capability of the storage electrode signals on the storage electrode line 1 to make better uniformity of the storage electrode signals over the whole display apparatus. Then, it is possible to improve the display effect of the display apparatus.

For example, an embodiment of the present disclosure provides a specific implementation of "each of the storage electrode lines 1 comprises at least two storage electrode signal input terminals 11".

Figure 1:
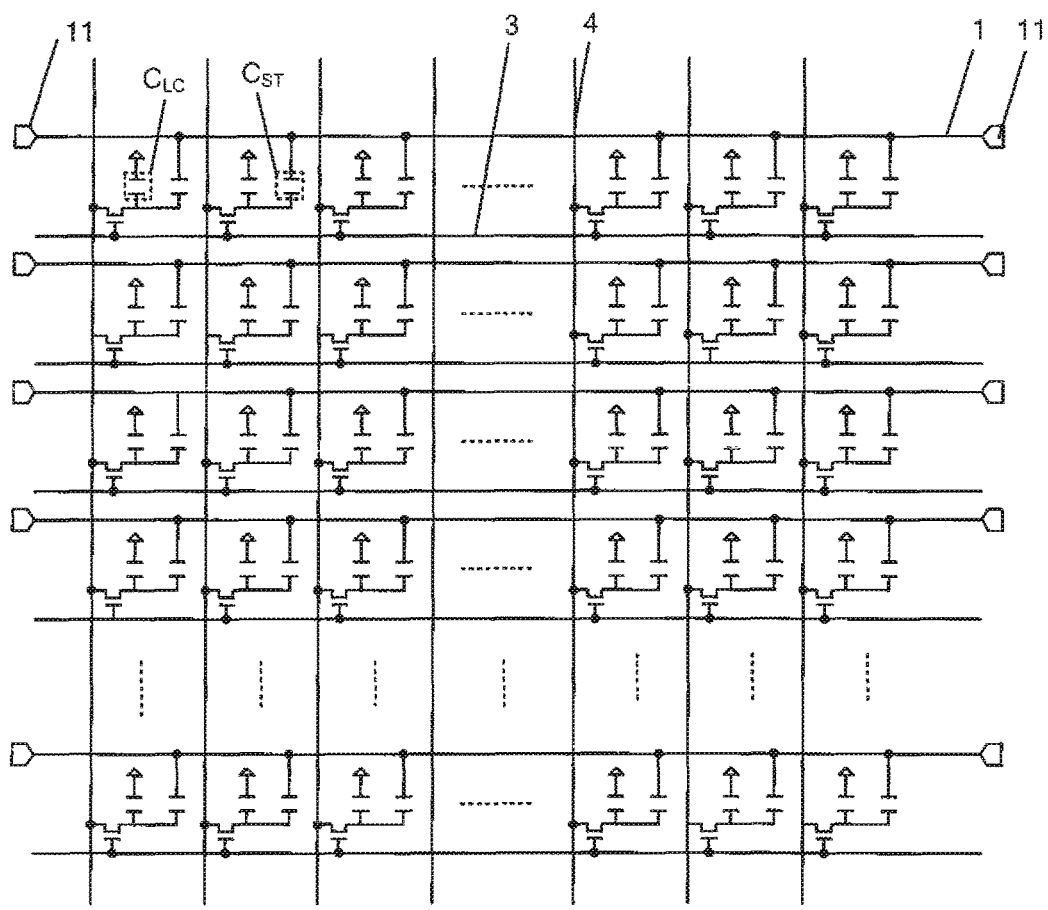
FIG. 1 is a schematic diagram of an array substrate in a first embodiment of the present disclosure.

In a first implementation, as shown in FIG. 1, each of the storage electrode lines 1 comprises two storage electrode signal input terminals 11 located at two ends of the storage electrode line 1.

Figure 2:
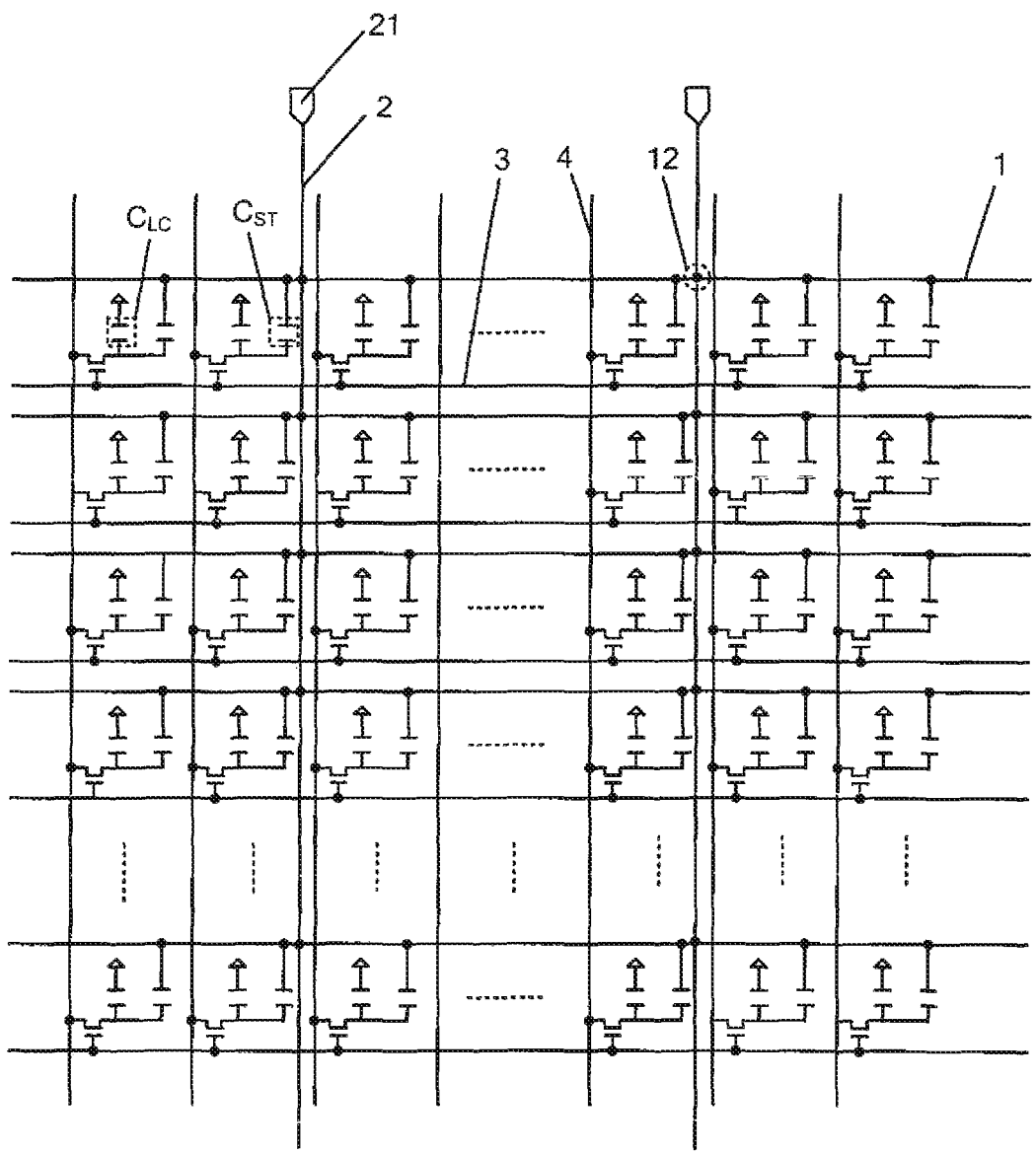
FIG. 2 is another schematic diagram of an array substrate in the first embodiment of the present disclosure.
Figure 3:
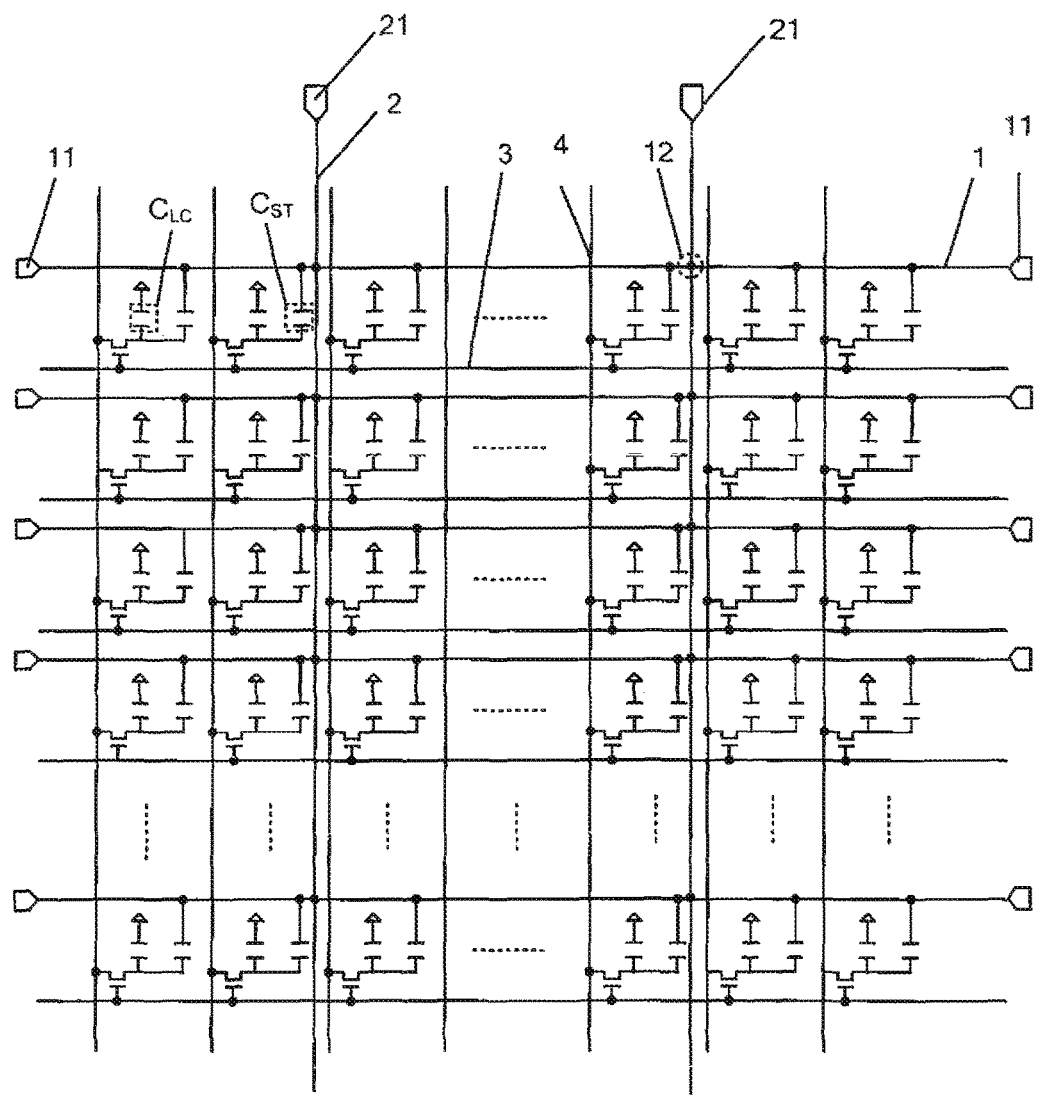
FIG. 3 is further another schematic diagram of an array substrate in the first embodiment of the present disclosure.

In a second implementation, as shown in FIG. 2 and FIG. 3, the array substrate further comprises at least one auxiliary storage electrode line 2. The auxiliary storage electrode line 2 is connected to the storage electrode lines 1. Each auxiliary storage electrode 2 comprises at least one auxiliary storage electrode signal input terminal 21, and one node 12 on the storage electrode line 1 connecting with the auxiliary storage electrode line 2 is taken as one storage electrode signal input terminal 11. It is noted that embodiments of the present disclosure do not limit the position of the node 12 on the storage electrode line 1, and those skilled in the art can select it based on practical needs.

Now, each storage electrode line 1 can comprise two storage electrode signal input terminals 11 located at the two ends of the storage electrode line 1, or each storage electrode line 1 can comprise one storage electrode signal input terminal 11 at one end of the storage electrode line 1, or it is possible that neither end of each storage electrode line 1 is arranged with the storage electrode signal input terminal 11, as long as each storage electrode line 1 comprises at least two storage electrode signal input terminals 11. The above is not limited by embodiments of the present disclosure.

For example, as shown in FIG. 2, only the node 12 on the storage electrode line 1 connecting with the auxiliary storage electrode line 2 is taken as the storage electrode signal input terminal 11, or as shown in FIG. 3, the node 12 on the storage electrode lines 1 connecting with the auxiliary storage electrode line 2 is taken as part of the storage electrode signal input terminals 11. In that case, the storage electrode line 1 also comprises other storage electrode signal input terminal(s) 11. For example, the storage electrode line 1 also comprises the storage electrode signal input terminals 11 located at the two ends of the storage electrode line 1.

Figure 4:
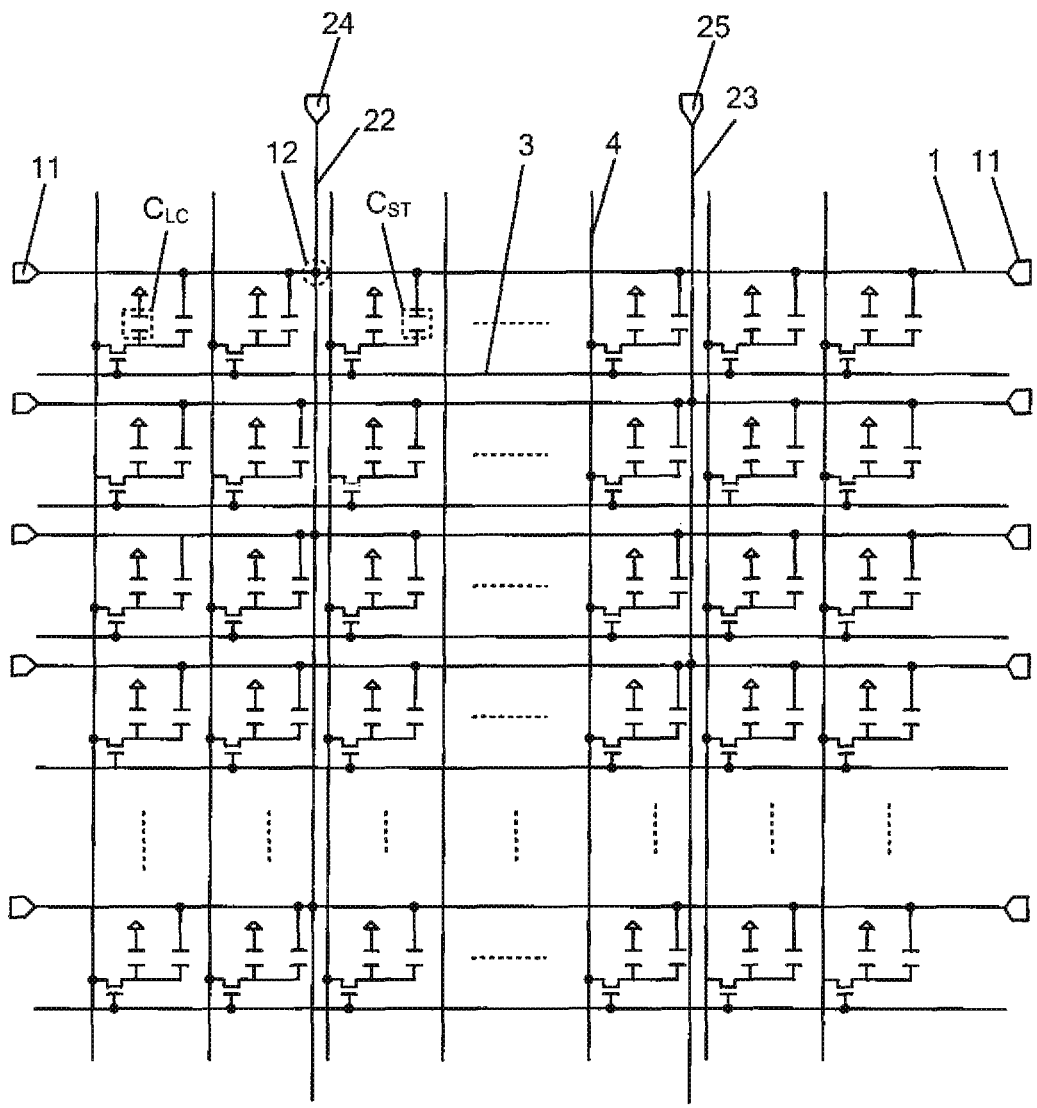
FIG. 4 is yet another schematic diagram of an array substrate in a first embodiment of the present disclosure.

Further, as shown in FIG. 2 and FIG. 3, each auxiliary storage electrode line 2 can be connected to all the storage electrode lines 1, or as shown in FIG. 4, each auxiliary storage electrode line 2 can only be connected to part of the storage electrode lines 1. If each auxiliary storage electrode line 2 is only connected to part of the storage electrode lines 1, the auxiliary storage electrode lines 2 on the array substrate can be arranged in the following way. As shown in FIG. 4, the auxiliary storage electrode line 2 comprises a first auxiliary storage electrode line 22 and a second auxiliary storage electrode line 23, and the first auxiliary storage electrode line 22 and the second auxiliary storage electrode line 23 are respectively connected to part of the storage electrode lines 1. It is noted that the storage electrode lines 1 connected to the first auxiliary storage electrode line 22 and the storage electrode lines 1 connected to the second auxiliary storage electrode line 23 can be all storage electrode lines 1 on the array substrate, or only part storage electrode lines on the array substrate, that is, the array substrate also comprises other storage electrode line(s) which is (are) not connected to the first auxiliary storage electrode line 22 or the second auxiliary storage electrode line 23, which is not limited by embodiments of the present disclosure. Further, the first auxiliary storage electrode line 22 is connected to odd numbered rows of the storage electrode lines 1, and the second auxiliary storage electrode line 23 is connected to even numbered rows of the storage electrode lines 1. In that case, the storage electrode lines 1 connected to the first auxiliary storage electrode line 22 and the storage electrode lines 1 connected to the second auxiliary storage electrode line 23 are all storage electrode lines 1 on the array substrate.

Further, as shown in FIG. 2-FIG. 4, the array substrate in an embodiment of the present disclosure further comprises multiple mutually parallel gate lines 3 and multiple mutually parallel data lines 4, the gate lines 3 cross the data lines 4, the storage electrode lines 1 extend in the direction of the gate lines 3, and the auxiliary storage electrode line 2 extends in the direction of the data lines 4. As an embodiment of the present disclosure, the above gate lines 3 and the data lines 4 surround multiple pixel units. A thin film transistor (TFT) and a pixel electrode are arranged in each pixel unit, wherein a gate of the TFT is connected to the gate line 3, a source of the TFT is connected to the data line 4, and a drain of the TFT is connected to the pixel electrode. The pixel electrode and a common electrode on the color film substrate are two electrodes of the LC capacitor $C_{LC}$, and the pixel electrode and the storage electrode line are two electrodes of the storage capacitor $C_{ST}$. If the array substrate has the structure as shown in FIG. 4, different auxiliary storage electrode signals are input respectively to the auxiliary storage electrode signal input terminal 24 of the first auxiliary storage electrode line 22 and the auxiliary storage electrode signal input terminal 25 of the second auxiliary storage electrode line 23, which can flexibly adjust the amplitude of the voltage on the pixel electrode.

An embodiment of the present disclosure provides an array substrate which comprises multiple storage electrode lines each of which comprises at least two storage electrode signal input terminals. Therefore, it is possible to input storage electrode signals to the storage electrode line from at least two storage electrode signal input terminals, and thus it is possible to enhance the driving capability of the storage electrode signals on the storage electrode line to make better uniformity of the storage electrode signals over the whole display apparatus. Then, it is possible to improve the display effect of the display apparatus.

In addition, an embodiment of the present disclosure also provides a display apparatus comprising any of the above array substrates. The display apparatus can be any product or component with display function such as a LC panel, an electronic paper, an organic light emitting display panel, a cell phone, a tablet PC, a television, a display, a notebook computer, a digital photo frame, a navigator or the like.

Second Embodiment

An embodiment of the present disclosure provides a driving method for driving an array substrate as described in the first embodiment. The driving method of the array substrate comprises: inputting storage electrode signals to at least two storage electrode signal input terminals 11 of the storage electrode line 1. Therefore, it is possible to enhance the driving capability of the storage electrode signals on the storage electrode line 1 to make better uniformity of the storage electrode signals over the whole display apparatus. Then, it is possible to improve the display effect of the display apparatus.

It is noted that the storage electrode signals can be the same as or different from the common electrode signal. If the storage electrode signals are the same as the common electrode signal, it is possible to reduce the driving complexity of the display apparatus. If the storage electrode signals are different from the common electrode signal, it is possible to improve the driving flexibility of the display apparatus. Therefore, those skilled in the art can make a choice based on the practical conditions.

Further, if, as shown in FIG. 1, each storage electrode line 1 comprises two storage electrode signal input terminals 11 located at two ends of the storage electrode line 1, the above-described inputting storage electrode signals to at least two storage electrode signal input terminals 11 of the storage electrode line 1 comprises: inputting the storage electrode signals to the two storage electrode signal input terminals 11 located at the two ends of each storage electrode line 1.

If, as shown in FIG. 2-FIG. 4, the array substrate comprises at least one auxiliary storage electrode line 2 which is connected to the storage electrode line 1, each auxiliary storage electrode 2 comprises at least one auxiliary storage electrode signal input terminal 21, and a node 12 on the storage electrode line 1 connecting with the auxiliary storage electrode line 2 is taken as a storage electrode signal input terminal 11 of the storage electrode line 1, the above-described inputting storage electrode signals to at least two storage electrode signal input terminals 11 of the storage electrode line 1 comprises: inputting the storage electrode signal to the node 12 on the storage electrode line 1 as the storage electrode signal input terminal 11 by inputting the storage electrode signal to the auxiliary storage electrode signal input terminal 21 of the auxiliary storage electrode line 2.

For example, if, as shown in FIG. 3 or FIG. 4, the node 12 on the storage electrode line 1 connecting with the auxiliary storage electrode line 2 is taken as part of the storage electrode signal input terminals 11, the storage electrode signal is input to the node 12 on the storage electrode line 1 as the storage electrode signal input terminal 11 by inputting the storage electrode signal to the auxiliary storage electrode signal input terminal 21 of the auxiliary storage electrode line 2, and at the same time, storage electrode signal(s) is (are) input to other storage electrode signal input terminal(s) 11 of the storage electrode line 1, to improve the driving capability of the storage electrode signals on the storage electrode line 1 to the largest extent.

Figure 5:
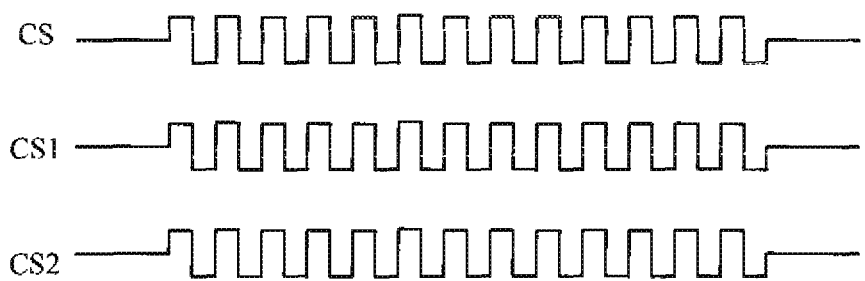
FIG. 5 is a time sequence diagram of a driving method of an array substrate in a second embodiment of the present disclosure.

FIG. 5 is a time sequence diagram of a driving method of an array substrate in the second embodiment of the present disclosure. Exemplarily, for the array substrate shown in FIG. 3, as shown in FIG. 5, storage electrode signals CS1 and CS2 are input respectively to the auxiliary storage electrode signal input terminals 21 of the two auxiliary storage electrode lines 2, and at the same time, a storage electrode signal CS is input to other storage electrode signal input terminals 11 of the storage electrode line 1, wherein CS, CS1 and CS2 are all the same, to improve the driving capability of the storage electrode signal on the storage electrode line 1.

Further, if, as shown in FIG. 4, the auxiliary storage electrode lines 2 comprises a first auxiliary storage electrode line 22 and a second auxiliary storage electrode line 23, and the first auxiliary storage electrode line 22 and the second auxiliary storage electrode line 23 are respectively connected to part of the storage electrode lines 1, the above-described inputting the storage electrode signal to the node 12 on the storage electrode line 1 as the storage electrode signal input terminal 11 by inputting the storage electrode signal to the auxiliary storage electrode signal input terminal 21 of the auxiliary storage electrode line 2 comprises: inputting a first storage electrode signal to a node 12 on the storage electrode line 1 connected to the first auxiliary storage electrode line 22 as the storage electrode signal input terminal 11 by inputting the first storage electrode signal to the auxiliary storage electrode signal input terminal 24 of the first auxiliary storage electrode line 22; and inputting a second storage electrode signal to a node 12 on the storage electrode line 1 connected to the second auxiliary storage electrode line 23 as the storage electrode signal input terminal 11 by inputting the second storage electrode signal to the auxiliary storage electrode signal input terminal 25 of the second auxiliary storage electrode line 23.

It is noted that the storage electrode lines 1 connected with the first auxiliary storage electrode line 22 and the storage electrode lines 1 connected with the second auxiliary storage electrode line 23 are all the storage electrode lines 1 on the array substrate or part of the storage electrode lines 1 on the array substrate, which is not limited by embodiments of the present disclosure. If the storage electrode lines 1 connected with the first auxiliary storage electrode line 22 and the storage electrode lines 1 connected with the second auxiliary storage electrode line 23 are part of the storage electrode lines 1 on the array substrate, that is, the array substrate also comprises other storage electrode line(s) 1 that is (are) not connected with the first auxiliary storage electrode line 22 and the second auxiliary storage electrode line 23, it is also needed to input storage electrode signal(s) to the storage electrode signal input terminal(s) 11 of other storage electrode line(s) 1.

Further, the first storage electrode signal and the second storage electrode signal can be the same or different. For example, in an embodiment of the present disclosure, the first storage electrode signal and the second storage electrode signal have different amplitudes, which can adjust the voltage on the pixel electrode more flexibly. For example, if, as shown in FIG. 4, the first auxiliary storage electrode line 22 is connected to the odd numbered rows of storage electrode lines 1, the second auxiliary storage electrode line 23 is connected to the even numbered rows of storage electrode lines 1, and the first storage electrode signal and the second storage electrode signal have different amplitudes, the voltage on the pixel electrode can be adjusted more flexibly.

Figure 6:
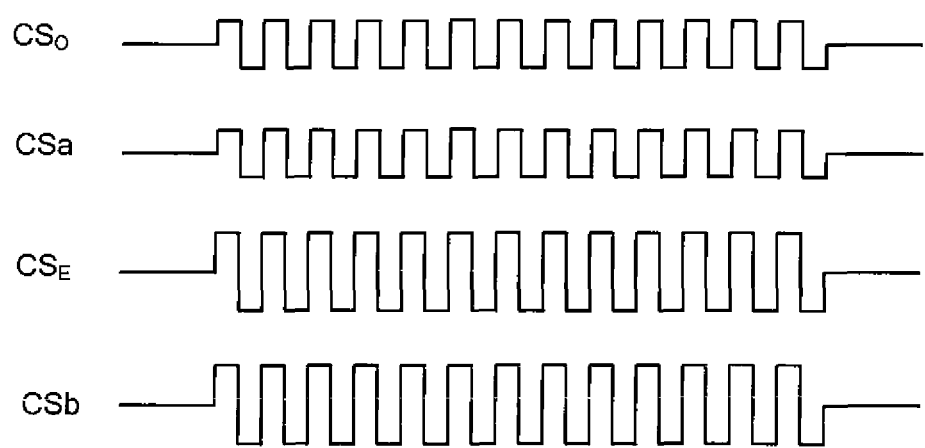
FIG. 6 is another time sequence diagram of a driving method of an array substrate in a second embodiment of the present disclosure.

FIG. 6 is another time sequence diagram of a driving method of an array substrate in the second embodiment of the present disclosure. Exemplarily, for the array substrate shown in FIG. 4, as shown in FIG. 6, a first storage electrode signal CSa is input to the auxiliary storage electrode signal input terminal 24 of the first auxiliary storage electrode line 22, a storage electrode signal $CS_O$ is input to other storage electrode signal input terminals 11 of the odd numbered rows of storage electrode lines 1, a second storage electrode signal CSb is input to the auxiliary storage electrode signal input terminal 25 of the second auxiliary storage electrode line 23, a storage electrode signal $CS_E$ is input to other storage electrode signal input terminals 11 of the even numbered rows of storage electrode lines 1, wherein CSa is the same as $CS_O$, CSb is the same as $CS_E$, but the amplitude of CSa and $CS_O$ is different from that of CSb and $CS_E$. Therefore, it is possible to adjust the voltage on the pixel electrode more flexibly.

An embodiment of the present disclosure provides a driving method of an array substrate. The driving method of the array substrate comprises inputting storage electrode signals to at least two storage electrode signal input terminals of the storage electrode line. Therefore, it is possible to enhance the driving capability of the storage electrode signals on the storage electrode line to make better uniformity of the storage electrode signals over the whole display apparatus. Then, it is possible to improve the display effect of the display apparatus.

The above descriptions are only specific implementations of the present disclosure, but the protection scope of the present disclosure is not limited to this. Changes or replacements that can be easily devised by those skilled in the art within the technical scope of the present disclosure should all fall within the protection scope of the present disclosure. Therefore, the protection scope of the present disclosure should be defined by the protection scope of the claims.

The present application claims the priority of Chinese Patent Application No. 201410841743.1 filed on Dec. 30, 2014, which as a whole is incorporated herewith as part of the present invention by reference.

What is claimed is:

1. An array substrate comprising multiple storage electrode lines each of which comprises at least two storage electrode signal input terminals, wherein two storage electrode signals, which are identical, are inputted from the at least two storage electrode signal input terminals,
   wherein one of the two storage electrode signals is received from one of the at least two storage electrode signal input terminals, and the other storage electrode signal is received from another one of the at least two storage electrode signal input terminals simultaneously, and
   wherein the array substrate further comprises at least one auxiliary storage electrode line which is connected to at least one of the multiple storage electrode lines, each of the at least one auxiliary storage electrode line comprises at least one auxiliary storage electrode signal input terminal, and nodes on the multiple storage electrode lines connecting with the at least one auxiliary storage electrode line are taken as the storage electrode signal input terminals.

2. The array substrate according to claim 1, wherein each of the storage electrode lines comprises two storage electrode signal input terminals located at two ends of the storage electrode line.

3. The array substrate according to claim 1, wherein only the nodes on the multiple storage electrode lines connecting with the at least one auxiliary storage electrode line are taken as the storage electrode signal input terminals.

4. The array substrate according to claim 1, wherein the nodes on the multiple storage electrode lines connecting with the at least one auxiliary storage electrode line are taken as part of the storage electrode signal input terminals.

5. The array substrate according to claim 1, wherein each of the at least one auxiliary storage electrode lines is connected to all the multiple storage electrode lines.

6. The array substrate according to claim 1, wherein the at least one auxiliary storage electrode line comprises a first auxiliary storage electrode line and a second auxiliary storage electrode line, and the first auxiliary storage electrode line and the second auxiliary storage electrode line are respectively connected to part of the storage electrode lines.

7. The array substrate according to claim 6, wherein the first auxiliary storage electrode line is connected to odd numbered rows of the storage electrode lines, and the second auxiliary storage electrode line is connected to even numbered rows of the storage electrode lines.

8. The array substrate according to claim 1, wherein the array substrate further comprises multiple mutually parallel gate lines and multiple mutually parallel data lines, the gate lines cross the data lines, the multiple storage electrode lines extend in the direction of the gate lines, and the at least one auxiliary storage electrode line extends in the direction of the data lines.

9. A display apparatus comprising array substrates according to claim 1.

10. A driving method of an array substrate comprising multiple storage electrode lines, each storage electrode line comprises at least two storage electrode signal input terminals, wherein two storage electrode signals, which are identical, are inputted from the at least two storage electrode signal input terminals, wherein the driving method comprises:
receiving one of the two storage electrode signals from one of the at least two storage electrode signal input terminals, and receiving the other storage electrode signal from another one of the at least two storage electrode signal input terminals simultaneously,
wherein the array substrate further comprises at least one auxiliary storage electrode line is connected to at least one of the multiple storage electrode lines, each of the at least one auxiliary storage electrode line comprises at least one auxiliary storage electrode signal input terminal, and nodes on the multiple storage electrode lines connecting with the at least one auxiliary storage electrode line are taken as the storage electrode signal input terminals, and
wherein said inputting storage electrode signals to at least two storage electrode signal input terminals of each storage electrode line comprises inputting the storage electrode signal to the node as the storage electrode signal input terminal by inputting the storage electrode signal to the auxiliary storage electrode signal input terminal of the at least one auxiliary storage electrode line.

11. The driving method of the array substrate according to claim 10, wherein the at least one auxiliary storage electrode line comprises a first auxiliary storage electrode line and a second auxiliary storage electrode line, and the first auxiliary storage electrode line and the second auxiliary storage electrode line are respectively connected to part of the storage electrode lines, and
wherein said inputting the storage electrode signal to the node as the storage electrode signal input terminal by inputting the storage electrode signal to the auxiliary storage electrode signal input terminal of the at least one auxiliary storage electrode line comprises:
inputting a first storage electrode signal to a node connecting the first auxiliary storage electrode line to at least one of the multiple storage electrode lines by inputting the first storage electrode signal to the auxiliary storage electrode signal input terminal of the first auxiliary storage electrode line; and
inputting a second storage electrode signal to a node connecting the second auxiliary storage electrode line to at least one of the multiple storage electrode lines by inputting the second storage electrode signal to the auxiliary storage electrode signal input terminal of the second auxiliary storage electrode line.

12. The driving method of the array substrate according to claim 11, wherein the first storage electrode signal is the same as the second storage electrode signal.

13. The driving method of the array substrate according to claim 11, wherein the first storage electrode signal is different from the second storage electrode signal.

14. The driving method of the array substrate according to claim 13, wherein the first storage electrode signal has a different amplitude from the second storage electrode signal.

15. The driving method of the array substrate according to claim 10, wherein inputting the storage electrode signal to the node as the storage electrode signal input terminal by inputting the storage electrode signal to the auxiliary storage electrode signal input terminal of the at least one auxiliary storage electrode line, and at the same time, inputting storage electrode signal(s) to storage electrode signal input terminal(s), except the node, of the storage electrode line with the node.

16. The driving method of the array substrate according to claim 10, wherein the storage electrode signals are the same as a common electrode signal.

17. The driving method of the array substrate according to claim 10, wherein the storage electrode signals are different from a common electrode signal.

18. The driving method of the array substrate according to claim 10, wherein
each of the storage electrode lines comprises two storage electrode signal input terminals located at two ends of the storage electrode line, and said inputting storage electrode signals to at least two storage electrode signal input terminals of each storage electrode line comprises:
inputting the storage electrode signals to the two storage electrode signal input terminals located at the two ends of each of the storage electrode lines.

* * * * *